(12) United States Patent
Maeno et al.

(10) Patent No.: US 6,380,660 B1
(45) Date of Patent: *Apr. 30, 2002

(54) VIBRATION TYPE ACTUATOR AND VIBRATION TYPE DRIVING APPARATUS

(75) Inventors: Takashi Maeno, Yokohama; Ichiro Okumura, Matsudo; Nobuyuki Kojima, Yokohama; Kenjiro Takemura, Tokyo, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 72 days.

(21) Appl. No.: 09/569,255

(22) Filed: May 11, 2000

(30) Foreign Application Priority Data

May 14, 1999 (JP) .......................................... 11-134487

(51) Int. Cl.$^7$ ................................................ H02N 2/00
(52) U.S. Cl. ............................. 310/323.02; 310/323.17
(58) Field of Search ....................... 310/323.01, 323.02, 310/323.03, 323.17

(56) References Cited

U.S. PATENT DOCUMENTS

| | | | |
|---|---|---|---|
| 4,580,073 A | 4/1986 | Okumura et al. | 310/323 |
| 4,587,452 A | 5/1986 | Okumura et al. | 310/328 |
| 4,678,956 A | 7/1987 | Izukawa et al. | 310/323 |
| 4,692,650 A | 9/1987 | Okumura et al. | 310/323 |
| 4,692,651 A | 9/1987 | Hiramatsu et al. | 310/323 |
| 4,734,610 A | 3/1988 | Okumura et al. | 310/323 |
| 4,752,711 A | 6/1988 | Tsukimoto et al. | 310/323 |
| 4,763,148 A | 8/1988 | Tsukimoto et al. | 354/195.1 |
| 4,771,203 A | 9/1988 | Mukohjima et al. | 310/323 |
| 4,788,468 A | 11/1988 | Izukawa et al. | 310/323 |
| 4,810,923 A | 3/1989 | Tsukimoto et al. | 310/323 |
| 4,947,076 A * | 8/1990 | Kumada | 310/323.02 |
| 5,008,581 A * | 4/1991 | Kumada et al. | 310/323.02 |
| 5,017,823 A | 5/1991 | Okumura | 310/323 |
| 5,099,166 A | 3/1992 | Hirano et al. | 310/323 |
| 5,128,580 A | 7/1992 | Maeno et al. | 310/323 |
| 5,155,407 A | 10/1992 | Kimura et al. | 310/323 |
| 5,274,295 A | 12/1993 | Tsukimoto et al. | 310/323 |
| 5,298,829 A | 3/1994 | Tsukimoto et al. | 310/323 |
| 5,300,850 A | 4/1994 | Okumura et al. | 310/323 |
| 5,436,522 A | 7/1995 | Tsukimoto et al. | 310/323 |
| 5,548,176 A * | 8/1996 | Oda | 310/328 |
| 5,585,685 A | 12/1996 | Maeno et al. | 310/323 |
| 5,646,469 A | 7/1997 | Tsukimoto et al. | 310/323 |
| 5,739,621 A | 4/1998 | Atsuta et al. | 310/316 |
| 5,760,529 A | 6/1998 | Tamai et al. | 310/323 |
| 5,770,916 A | 6/1998 | Ezaki et al. | 310/366 |
| 5,814,919 A | 9/1998 | Okumura | 310/323 |
| 5,917,270 A | 6/1999 | Tsukimoto et al. | 310/323.12 |
| 5,949,178 A | 9/1999 | Tamai et al. | 310/323 |
| 5,952,766 A | 9/1999 | Mukohjima et al. | 310/323.04 |
| 6,051,911 A | 4/2000 | Kojima et al. | 310/323 |
| 6,121,717 A * | 9/2000 | Diefenbach et al. | 310/323.02 |

* cited by examiner

Primary Examiner—Thomas M. Dougherty
(74) Attorney, Agent, or Firm—Fitzpatrick, Cella, Harper & Scinto

(57) ABSTRACT

The present invention relates to a vibration type actuator or a vibration type driving apparatus that includes a vibration member that generates therein respective vibration displacements in at least three different directions, and a plurality of contact members contacting the vibration member, wherein the respective vibration displacements in the three different directions generate a composite vibration that simultaneously moves selected contact members of the plurality of contact members relative to the vibration member.

27 Claims, 5 Drawing Sheets

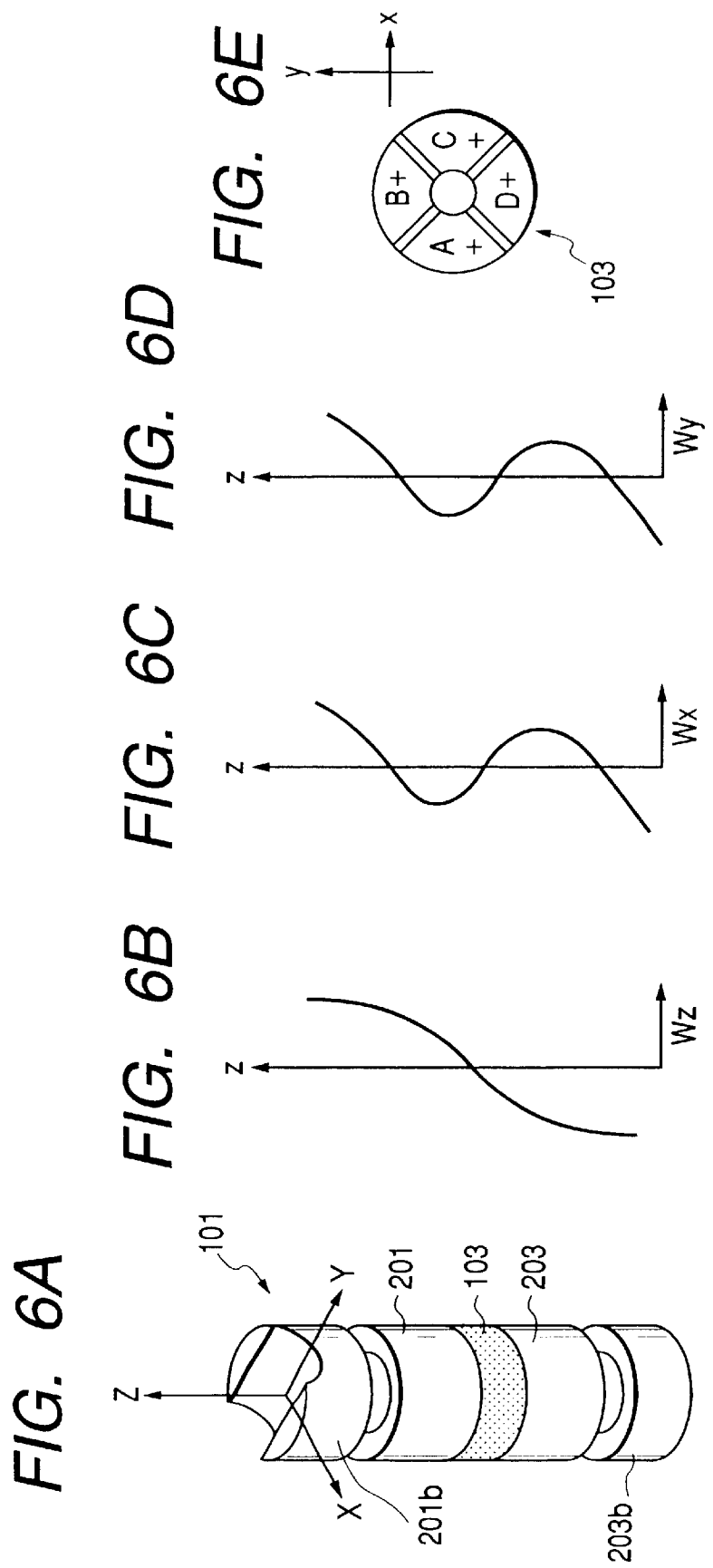

VIBRATION TYPE ACTUATOR AND VIBRATION TYPE DRIVING APPARATUS

BACKGROUND OF THE INVENTION

1. Field of the Invention

The present invention relates to a vibration type actuator and vibration type driving apparatus using vibrations of a vibration member.

2. Related Background Art

Spherical vibration type actuators are proposed in, e.g., Japan Soc. Prec. Eng. (Vol. 61, No. 3, pp. 1227–1230, 1995) and Nikkei Mechanical (No. 5, pp. 26–27, 1997.4.28) as vibration type actuators for generating multiaxial motions.

There is also proposed a vibration type actuator using a single vibration member, for generating driving forces having a multi-degree of freedom (three degrees of freedom) with a simple arrangement.

Such vibration type actuator using a single vibration member for generating driving forces having, e.g., three degrees of freedom has the following basic mechanical structure. For example, a recess is formed at one end of a rod-like vibration member. Part of a spherical rotary member is fitted in the recess. A press mechanism brings the rotary member into press contact with the vibration member. Where the axial direction of the vibration member is defined as the Z-axis, the two axes perpendicular to the Z-axis are defined as the X- and Y-axes, respectively. Driving vibrations, as a combination of vibration displacements, are generated in the vibration members in these three axes so as to apply X-, Y-, and Z-axis rotations to the spherical rotary member.

For example, a piezoelectric element serving as an electro-mechanical energy conversion element applies to the vibration member vibration displacements in three different directions, e.g., a Z-axis vibration (longitudinal vibration), a bending vibration in Z-X plane, and a bending vibration in Z-Y plane. By generating two bending vibrations having a time phase difference, a composite vibration of these two bending vibrations forms driving vibration, thereby rotating the spherical rotary member about the Z-axis.

A composite vibration of the longitudinal vibration and Z-X bending vibration rotates the spherical rotary member about the Y-axis.

A composite vibration of the longitudinal vibration and Z-Y bending vibration rotates the spherical rotary member about the X-axis.

The conventional multi-degree-of-freedom vibration type actuator has one spherical rotary member as a driven member and suffers the following problems.

(1) Since one rotary member has three degrees of freedom, it has no mechanically fixed rotation axis.

Complicated control is required to determine the rotation axis. For example, even if an axial member having an axis matching the spherical center of the rotary member is disposed to extend radially outward, the axial member is not axially supported so as to be rotatable at a fixed position. Accordingly, control is required to maintain the axial member at a position coinciding with a predetermined axial direction position. In addition, driving control must be performed to rotate the rotary member about the axis of the axial member, thereby complicating control.

(2) Since the rotary member is spherical and has no mechanically fixed axis, the structure and arrangement of the press member becomes complicated.

SUMMARY OF THE INVENTION

According to one aspect of the present invention, the first arrangement of a vibration type actuator comprise a vibration member forming vibration generation means for generating vibration displacements in at least three different directions, wherein the vibration displacements in the three different directions are applied to the vibration member to generate a composite vibration, and the vibration member and at least one of a plurality of contact members brought into contact with the vibration member is moved relative to the vibration member.

The above and other objects, features, and advantages of the present invention will be apparent from the following detailed description of the invention in conjunction with the accompanying drawings.

BRIEF DESCRIPTION OF THE DRAWINGS

FIG. 6A is a perspective view of the vibration member shown in FIG. 4,

FIGS. 6B, 6C, and 6D are views showing the vibration displacement distributions in the Z-, X-, and Y-axes, respectively, and FIG. 6E is a view showing the polarized state of a piezoelectric element; and FIGS. 7A, 7B, 7C and 7D show a vibration actuator of the first embodiment, in which FIG. 7A is a plan view of the actuator, FIG. 7B is a side sectional view thereof, FIG. 7C is a bottom view thereof, and FIG. 7D is a perspective view of a cylindrical clip.

DESCRIPTION OF THE PREFERRED EMBODIMENTS

First Embodiment

FIGS. 1, 2, 3A to 3E and FIGS. 7A to 7D show the first embodiment of the present invention.

Figure 1:
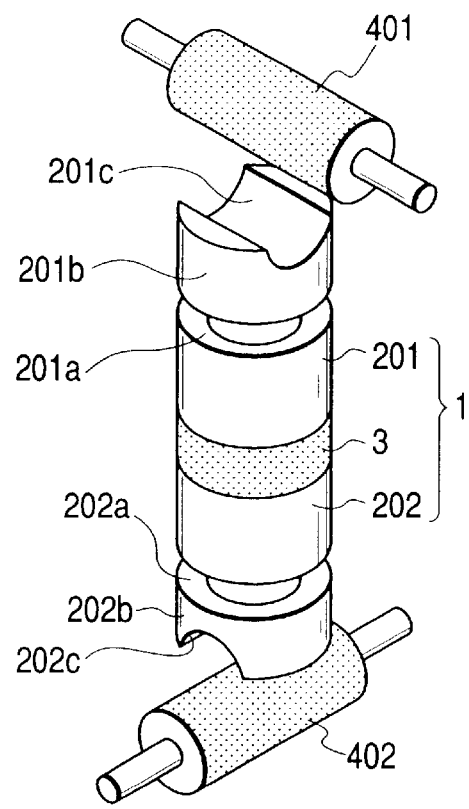
FIG. 1 is an exploded perspective view showing the main part of the first embodiment of the present invention.

FIG. 1 is an exploded perspective view showing the main part of the first embodiment of the present invention.

Figure 2:
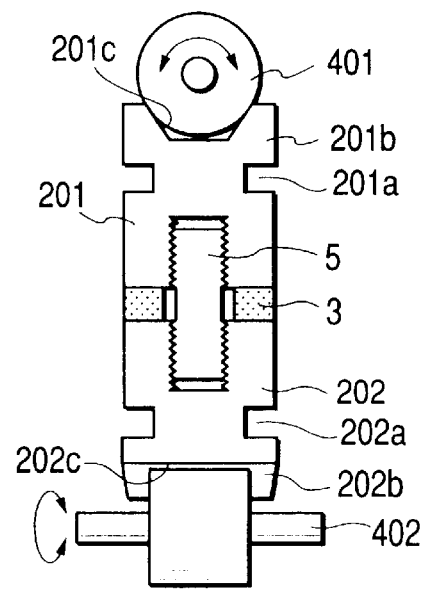
FIG. 2 is a side sectional view of the embodiment shown in FIG. 1.

A columnar vibration member 1 has the following structure. A stacked type piezoelectric element (to be referred to as a piezoelectric element hereinafter) 3 obtained as a stacked electro-mechanical energy conversion element by forming electrode films between a plurality of piezoelectric ceramic members is sandwiched between first and second metal elastic members 201 and 202. As shown in FIG. 2, a bolt 5 threadably engages the elastic members 201 and 202 to fix the piezoelectric element 3 between them. In this embodiment, although the stacked type piezoelectric element is used as an electro-mechanical energy conversion element, one piezoelectric element may be used.

In this embodiment, annular grooves 201a and 202a for increasing the vibration displacements are respectively formed in the first and second elastic members 201 and 202 about the central axis (Z-axis). Bearing portions 201c and 202c serving as stationary shaft forming portions are made of V-grooves at driving portions 201b and 202b on the farther distal end sides of the annular grooves 201a and 202a in directions perpendicular to the central axis (Z-axis), respectively, as shown in FIG. 2. The axis (Y-axis) defined by the first bearing portion 201c formed on the first elastic member 201 is perpendicular to the axis (X-axis) defined by the second bearing portion 202c formed on the second elastic member 202.

In this embodiment, first and second rotary members 401 and 402 having a cylindrical shape are disposed on the first and second bearing portions 201c and 202c, respectively. A press mechanism (not shown) brings the first and second rotary members 401 and 402 into press contact with the first and second bearing portions 201c and 202c, respectively.

That is, in this embodiment, the first and second rotary members 401 and 402 serving as moving members having stationary axes perpendicular to each other are supported on the two end portions of one rod-like vibration member 1.

The bearing portions 201c and 202c respectively formed in the first and second elastic members 201 and 202 are made of V-grooves. However, the bearing portions 201c and 202c may be made of cylindrical surfaces similar to the cylindrical outer surfaces of the rotary members 401 and 402. Alternatively, a plurality of slits perpendicular to the axial direction of each of the bearing portions 201c and 202c may be formed along its axial direction to increase the vibration displacements.

The first and second rotary members 401 and 402 need not have the same shape or diameter. When the diameter of a rotary member increases, the output torque increases, when the diameter of a rotary member decreases, the rotational speed increases. Rotary members suited to any application can be designed.

FIGS. 3A to 3E show the structure of a vibration type actuator of this embodiment and its driving principle.

The cylindrical vibration member 1 vibrates due to vibration of the piezoelectric element 3 sandwiched at approximately the central position between the first and second elastic members 201 and 202.

Figure 3E:
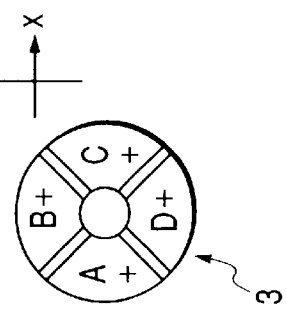
FIG. 3E is a view showing the polarized state of a piezoelectric element.
Figure 3D:
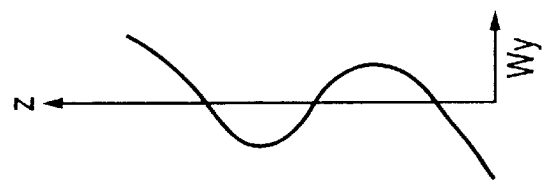
FIGS. 3B, 3C, and 3D are views showing the vibration displacement distributions in the Z-, X-, and Y-axes, respectively.
Figure 3C:
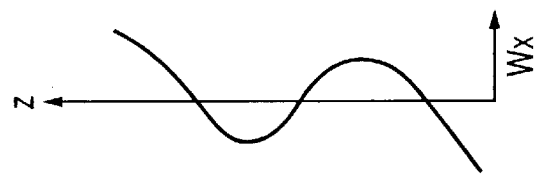
Figure 3B:
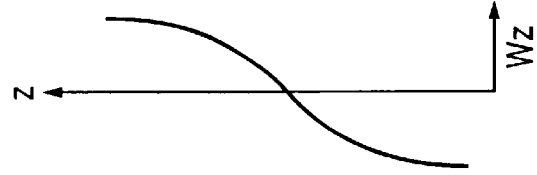
Figure 3A:
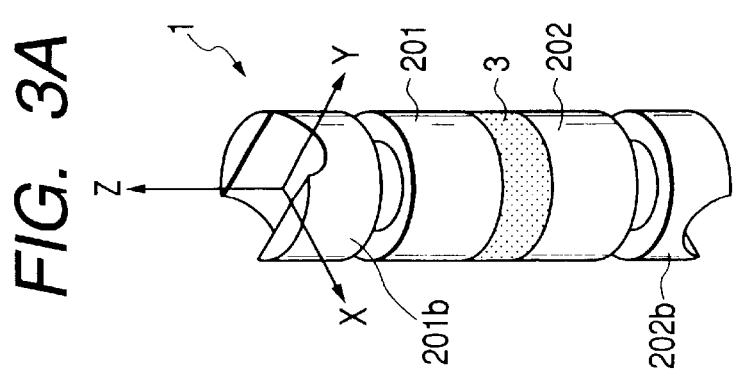
FIG. 3A is a perspective view of the vibration member shown in FIG. 1.

FIGS. 3B, 3C, and 3D show axial (Z) distributions of displacements in the Z, X, and Y directions, respectively.

More specifically, a Z-direction vibration displacement Wz is a longitudinal vibration (vibration stretching and contracting in the axial direction) having one node at the center. An X-direction vibration displacement Wx is a bending vibration having three nodes. A Y-direction vibration displacement Wy is also a bending vibration having three nodes.

When the vibration displacements Wz and Wx are generated to have a time phase difference of 90°, elliptical or circular motions are generated about the Y-axis (X-Z plane) at the two end portions of the vibration member 1.

The axis (Y) of such a motion matches the axis of the first rotary member 401. The first rotary member 401 rotates about the Y-axis based on this motion. In this case, since the axis of the motion does not match the axis of the second rotary member 402, the second rotary member 402 does not rotate.

When the sign of the time phase difference of the vibration displacement is inverted (–90°), the rotational direction of the first rotary member 401 is reversed.

When the combination of vibrations is changed to generate vibration displacements Wz and Wy with a time phase difference of 90°, elliptical or circular motions are generated about the X-axis (Y-Z plane) at the two end portions of the vibration member 1.

The axis (X) of such a motion matches the axis of the second rotary member 402, and the second rotary member 402 rotates. In this case, this axis does not match the axis of the first rotary member 401, and the first rotary member 401 does not rotate.

When the vibration displacements Wz, Wx, and Wy are combined with appropriate time phase differences, the first and second rotary members 401 and 402 can be simultaneously rotated. In this case, an X-axis driving force is applied to the first rotary member 401 in addition to the Y-axis rotational force. The X-axis driving force rotates the second rotary member 402 and also serves as a force for moving the first rotary member 401 along the Y-axis. The first rotary member 401 moves straight while rotating. The straight moving force increases or decreases by changing the magnitude of circular or elliptical motion of the composition vibration or the shape of the driving portion, thereby preventing the straight moving force from acting on the first rotary member 401. Alternatively, a member for preventing straight movement may be used as needed. A straight moving force along the X-axis can similarly be applied to the second rotary member 402.

FIG. 3E shows the structure of the piezoelectric element 3 which generates these three vibration displacements.

Alternating signals (voltages) for independently driving four polarized regions can be applied to the piezoelectric element 3 (a plurality of piezoelectric ceramic plates each polarized into four in-phase regions are stacked to form blocks) serving as an electro-mechanical energy conversion element having four polarized regions. Although not shown in FIGS. 1 and 3A to 3E, electrode plates connected to a driving control circuit (not shown) are formed on the two surfaces of the piezoelectric element 3 in units of polarized regions.

Referring to FIG. 3E, polarized regions A, B, C, and D of the piezoelectric element 3 are polarized with the same sign. As shown in the vibration displacement distribution in FIG. 3B, the same signal is applied to all the electrodes (not shown) contacting the polarized regions in order to vibrate the vibration member 1 in the Z direction. A voltage $V_A$ applied to the polarized region A via the corresponding electrode, a voltage $V_B$ applied to the polarized region B via the corresponding electrode, a voltage $V_C$ applied to the polarized region C via the corresponding electrode, and a voltage $V_D$ applied to the polarized region D via the corresponding electrode have the following relation:

$$V_A = V_B = V_C = V_D = \sin \omega t$$

Alternatively, the same signal is applied to each pair of opposing electrodes:

$$V_A = V_C = \sin \omega t$$

or $$V_B = V_D = \sin \omega t$$

To vibrate the vibration member 1 in the X direction, as indicated by the vibration displacement distribution in FIG.

3C, signals of opposite phases are applied to the polarized regions A and C opposing in the X direction, respectively:

if $V_A=\sin \omega t$, then $V_C=-\sin \omega t$ (if $V_A=\cos \omega t$, then $V_C=-\cos \omega t$).

To vibrate the vibration member 1 in the Y direction, as indicated by the vibration displacement distribution in FIG. 3D, signals of opposite phases are applied to the polarized regions B and D opposing in the Y direction, respectively:

if $V_B=\sin \omega t$, then $V_D=-\sin \omega t$ (if $V_B=\cos \omega t$, then $V_D=-\cos \omega t$).

The frequency $\omega$ of the alternating signal (voltage) is selected to be a value close to the natural frequency of the vibration member so as to obtain a large amplitude.

In this embodiment, the natural frequency of the vibration member 1 is the natural frequency of the longitudinal primary mode for the Z-direction vibration, and the natural frequencies of the bending secondary modes for the X and Y directions.

Supply of the alternating signals for rotating the first and second rotary members 401 and 402 will be described below.

To rotate the rotary member 401 about the Y-axis, Z- and X-axis displacements having a phase difference of, e.g., 90° are generated.

The following alternating signals are supplied to the corresponding polarized regions A, B, C, and D:

$V_A=V_B=V_C=V_D=\sin \omega t$ (Z-direction displacement)

$V_A=\cos \omega t$, $V_C=-\cos \omega t$ (X-direction displacement)

That is, the following equations are derived:

$V_A=\sin \omega t+\cos \omega t=\sqrt{2}\sin(\omega t+\pi/4)$ $V_B=\sin \omega t$ $V_C=\sin \omega t-\cos \omega t=\sqrt{2}\sin(\omega t-\pi/4)$ $V_D=\sin \omega t$ Note that the coefficient, i.e., the voltage amplitude need not be 1 or $\sqrt{2}$. The coefficient can be set to an appropriate value to obtain a desired driving state.

Similarly, to rotate the second rotary member 402 about the X-axis, Z- and Y-axis displacements having a phase difference of, e.g., 90° are generated.

The following alternating signals are supplied to the corresponding polarized regions A, B, C, and D:

$V_A=V_B=V_C=V_D=\sin \omega t$ (Z-direction displacement)

$V_B=\cos \omega t$, $V_D=-\cos \omega t$ (Y-direction displacement)

That is, the following equations are derived:

$V_A=\sin \omega t$ $V_B=\sin \omega t+\cos \omega t=\sqrt{2}\sin(\omega t+\pi/4)$ $V_C=\sin \omega t$ $V_D=\sin \omega t-\cos \omega t=\sqrt{2}\sin(\omega t-\pi/4)$ Note that the coefficient, i.e., the voltage amplitude need not be 1 or $\sqrt{2}$. The coefficient can be set to an appropriate value to obtain a desired driving state.

As described above, according to the first embodiment, the vibration member 1 can rotate the first and second rotary members 401 and 402 about the Y- and Z-axes, respectively. Rotations having two degrees of freedom having two stationary axes perpendicular to each other with respect to the axis of the vibration member 1 can be obtained.

FIGS. 7A to 7D show the overall structure of an actuator obtained by adding a support member for the vibration member and a press mechanism to the main part of the two-degree-of-freedom actuator shown in the first embodiment.

Referring to FIGS. 7A to 7D a flexible printed board 10 and a support member 9 made of a thin metal plate are disposed on two sides of the piezoelectric element 3. These members are sandwiched between the first and second elastic members 201 and 202 to be integrally fixed and obtain the vibration member 1.

The stacked type piezoelectric element 3 of this embodiment has positive and negative electrode films of the polarized regions on one end face. Patterns serving as electrode plates brought into contact with the positive and negative electrode films on one end face of the piezoelectric element 3 are formed on the flexible printed board 10. Electrode plates need not be arranged on the two sides of the piezoelectric element 3 to power the element 3. The printed board 10 can be disposed on only one side, like this embodiment.

The support member 9 integrally arranged with the vibration member 1 extends outward from the two sides of the vibration member 1 along the axial direction of the second rotary member 402. Both sides of extending end portions are wound and supported on a flange 7c of a second case 7b (to be described later).

A rectangular parallelepiped case 7 is made up of a first case 7a and the second case 7b. A flange 7d of the first case 7a is disposed to oppose the flange 7c of the second case 7b. The flange 7d of the first case 7a and the flange 7c of the second case 7b are elastically clamped by a cylindrical clip 8 made of a spring member having a C-shaped section.

The case 7 accommodates the vibration member 1 and the first and second rotary members 401 and 402. A shaft portion 401a of a first rotary member 401 is rotatably supported on bearing members 6a and 6b attached to the first case 7a. Similarly, a shaft portion 402a of a second rotary member 402 is rotatably supported on bearing members 6c and 6d attached to the second case 7b. The axis of the bearing portions 6a and 6b opposing and attached to the first case 7a is perpendicular to that of the bearing portions 6c and 6d opposing and attached to the second case 7b.

As described above, the extending end portion of the support member 9 is wound and fixed on the flange portion 7c of the second case 7b to support the vibration member 1 in the second case 7b. When the first case 7a is opposed to the second case 7b, and the flanges 7d and 7c of the first and second cases 7a and 7b are elastically clamped by the cylindrical clip 8, as described above, the first and second rotary members 401 and 402 respectively come into pressingly contact with the first and second bearing portions 201c and 202c of the vibration member 1 by the spring force of the cylindrical clip 8. The extending end portion of the support member 9 of the vibration member 1 is integrally gripped and fixed to the flange portion 7c of the second case 7b by the cylindrical clip 8.

The flexible printed board 10 is sandwiched and fixed between the piezoelectric element 3 and the first elastic member 201. An end portion of the flexible printed board 10 extends outside the case 7 and is connected to a driving control circuit (not shown). The alternating signal (voltage) is supplied to the piezoelectric element 3 via this flexible printed board 10.

Second Embodiment

FIGS. 4, 5 and 6A to 6E show the second embodiment of the present invention.

Figure 4:
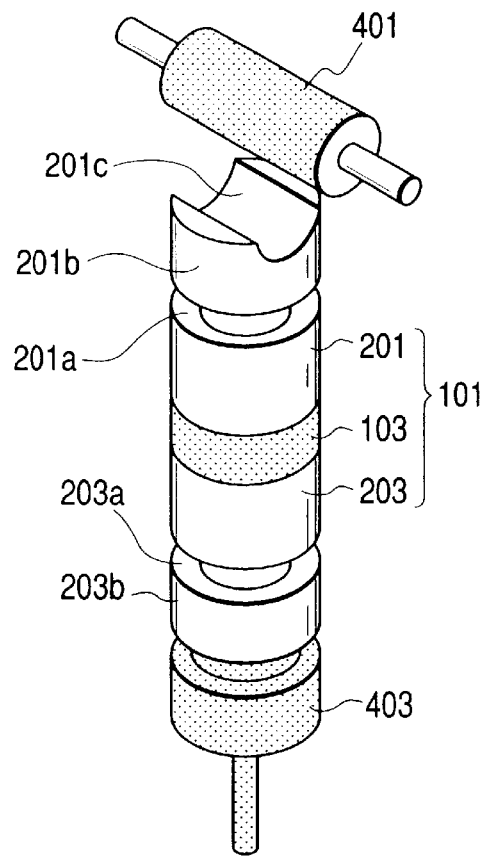
FIG. 4 is an exploded perspective view showing the main part of the second embodiment of the present invention.
Figure 5:
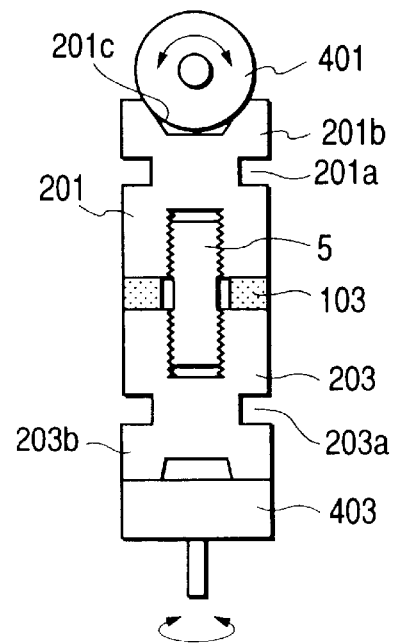
FIG. 5 is a side sectional view of the embodiment shown in FIG. 4.
Figure 7A:
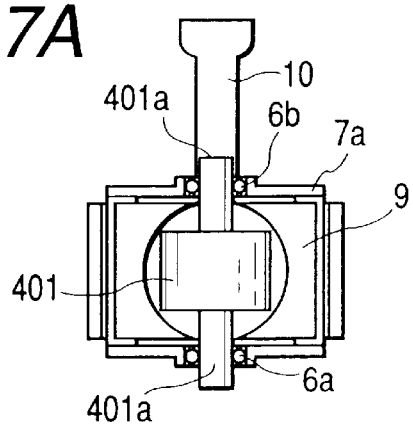
Figure 7B:
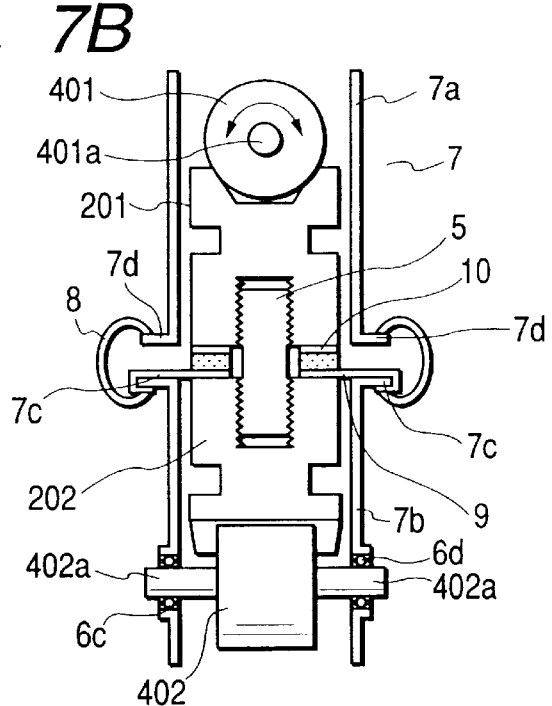
Figure 7C:
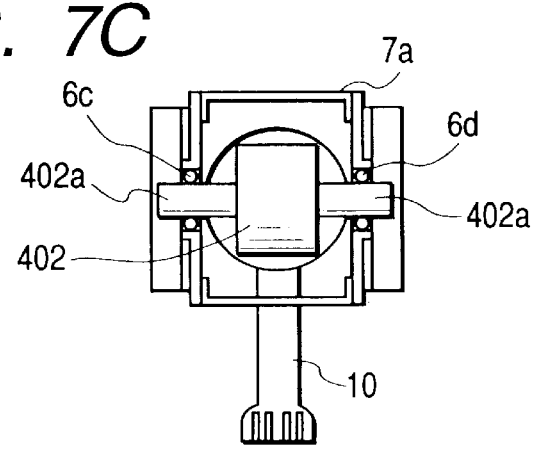
Figure 7D:
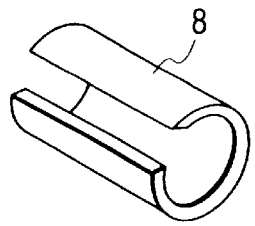

FIG. 4 is an exploded perspective view of the main part of the second embodiment of the present invention.

A vibration member 101 of this embodiment has the following structure. A piezoelectric element 103 is sandwiched between first and second metal elastic members 201 and 203. A bolt 5 disposed at core portions of the members 201 and 203 threadably engages with and is fixed to them.

As in the first embodiment, the first elastic member 201 has an annular groove 201a for increasing vibration displacements. A driving portion 201b having a bearing portion 201c is formed on the first elastic member 201 on the farther end side than the annular groove 201a. A press mechanism (not shown) brings a rotary member 401 into press contact with the bearing portion 201c.

The second elastic member 203 has an annular groove 203a for increasing vibration displacements. A driving portion 203b is formed on the second elastic member 203 on the farther end side than the annular groove 203a. A press member (not shown) brings a second rotary member 403 having the center of rotation as the central axis of the vibration member 101 into press contact with the end face of the driving portion 203b.

The bearing portion 201c formed in the first elastic member 201 is made of a V-groove as in the first embodiment, but may be a cylindrical surface like the outer surface of the first rotary member 401.

When the diameter of the first rotary member 401 increases, the output torque increases. When the diameter decreases, the rotational frequency increases. Rotary members suited to any application can be designed.

FIGS. 6A to 6E show the structure of a vibration type actuator of this embodiment and its driving principle.

The cylindrical vibration member 101 elastically vibrates due to vibration of the piezoelectric element 103 sandwiched at approximately the central position between the first and second elastic members; 201 and 203. FIGS. 6B, 6C, and 6D show axial (Z) distributions of displacements in the Z, X, and Y directions, respectively.

More specifically, a Z-direction vibration displacement Wz is a longitudinal vibration (vibration stretching and contracting in the axial direction) having one node at the center. An X-direction vibration displacement Wx is a bending vibration having three nodes. A Y-direction vibration displacement Wy is also a bending vibration having three nodes.

When the vibration displacements Wz and Wx are generated to have a time phase difference of 90°, elliptical or circular motions are generated about the Y-axis (X-Z plane) at the two end portions of the vibration member 1.

The axis (Y) of such a motion matches the axis of the first rotary member 401. The first rotary member 401 rotates about the Y-axis.

Although elliptical or circular motion is generated in the second elastic member 203, the rotary member 403 does not rotate because the axis of motion does not match that of the second rotary member 403.

When the sign of the time phase difference of the vibration displacement is inverted (−90°), the rotational direction of the first rotary member 401 is reversed.

When the combination of vibrations is changed to generate vibration displacements Wx and Wy with a time phase difference of 90° (composite bending vibration), elliptical or circular motions are generated about the Z-axis (X-Y plane) at the two end portions of the vibration member 101.

The axis (Z) of such a motion matches the axis of the second rotary member 403 having the center of rotation as the central axis of the vibration member 101, and the second rotary member 403 rotates. In this case, this axis does not match the axis of the first rotary member 401, and the first rotary member 401 does not rotate.

When the vibration displacements Wz, Wx, and Wy are combined with appropriate time phase differences, the first and second rotary members 401 and 403 can be simultaneously rotated.

FIG. 6E shows the structure of the piezoelectric element 103 which generates these three vibration displacements. The piezoelectric element 103 has the same structure as that of the piezoelectric element 3 of the first embodiment shown in FIG. 3E. Electrode plates connected to a driving circuit (not shown) are formed in correspondence with the respective polarized regions of the piezoelectric element 103.

Alternating signals (voltages) for independently driving four polarized regions can be applied from a driving circuit (not shown) to the piezoelectric element 103 (a plurality of piezoelectric ceramic plates each polarized into four in-phase regions are stacked to form blocks) serving as an electro-mechanical energy conversion element having four polarized regions via the electrode plates.

Referring to FIG. 6E, polarized regions A, B, C, and D of the piezoelectric element 103 are polarized with the same sign. As shown in the vibration displacement distribution in FIG. 6B, the same signal is applied to all the polarized regions in order to vibrate the vibration member 101 in the Z direction:

$$V_A = V_B = V_C = V_D = \sin \omega t$$

Alternatively, the same signal is applied to each pair of opposing electrodes:

$$V_A = V_C = \sin \omega t$$

or $$V_B = V_D = \sin \omega t$$

To vibrate the vibration member 101 in the X direction, as indicated by the vibration displacement distribution in FIG. 6C, signals of opposite phases are applied to the polarized regions A and C opposing the X direction:

if $V_A = \sin \omega t$, then $V_C = -\sin \omega t$ (if $V_A = \cos \omega t$, then $V_C = -\cos \omega t$)

To vibrate the vibration member 101 in the Y direction, as indicated by the vibration displacement distribution in FIG. 6D, signals of opposite phases are applied to the polarized regions B and D which oppose the Y direction:

if $V_B = \sin \omega t$, then $V_D = -\sin \omega t$ (if $V_B = \cos \omega t$, then $V_D = -\cos \omega t$)

The frequency ω of the alternating signal (voltage) is selected to be a value close to the natural frequency of the vibration member to obtain a large amplitude.

In this embodiment, the natural frequency of the vibration member 101 is the natural frequency of the longitudinal primary mode for the Z-direction vibration, and the natural frequencies of the bending secondary modes for the X and Y directions.

Supply of the alternating signals for rotating the first and second rotary members 401 and 403 will be described below.

To rotate the rotary member 401 about the Y-axis, Z- and X-directions displacements having a phase difference of, e.g., 90° are generated.

The following alternating signals are supplied to the corresponding polarized regions A, B, C, and D:

$V_A=V_B=V_C=V_D=\sin \omega t$ (Z-direction displacement)

$V_A=\cos \omega t, V_C=-\cos \omega t$ (X-direction displacement)

That is, the following equations are derived:

$V_A=\sin \omega t+\cos \omega t=\sqrt{2}\sin (\omega t+\pi/4)$ $V_B=\sin \omega t$ $V_C=\sin \omega t-\cos \omega t=\sqrt{2}\sin (\omega t-\pi/4)$ $V_D=\sin \omega t$ Note that the coefficient, i.e., the voltage amplitude need not be 1 or $\sqrt{2}$. The coefficient can be set to an appropriate value to obtain a desired driving state.

Similarly, to rotate the second rotary member 403 about the Z-axis, X- and Y-direction displacements having a phase difference of, e.g., 90° are generated.

The following alternating signals are supplied to the corresponding polarized regions A, B, C, and D:

$V_A=\sin \omega t, V_C=-\sin \omega t$ (X-direction displacement)

$V_B=\cos \omega t, V_D=-\cos \omega t$ (Y-direction displacement)

That is, the following equations are derived:

$V_A=\sin \omega t$ $V_B=\cos \omega t$ $V_C=-\sin \omega t$ $V_D=-\cos \omega t$ Note that the coefficient, i.e., the voltage amplitude need not be 1. The coefficient can be set to an appropriate value to obtain a desired driving state.

When the vibration member and the rotary members 401 and 403 of the second embodiment are accommodated in a case, as shown in FIGS. 7A to 7D, a bearing member for axially supporting the shaft portion of the second rotary member 403 is formed on the bottom portion of a second case 7b.

In each of the multi-degree-of-freedom vibration type actuators of the first and second embodiments described above, the moving (rotation or straight movement) axis different from the axis of the single vibration member 1 or 101 is uniquely determined. The actuator can be used as a driving source of an X-Y table or the like. A vibration wave driving apparatus for driving a driven member using the multi-degree-of-freedom vibration type actuator as the driving source is not limited to the X-Y table described above. This actuator can be applied to an apparatus in which one or a plurality of driven members are simultaneously or selectively driven in accordance with outputs from different directions.

In addition, an encoder or the like can be attached to the shaft portion of a rotary member to allow feedback control.

As has been described above, according to the above embodiments, a single vibration member and a plurality of contact members can be moved relative to each other with moving axes.

When two rotary members as the contact members are comprised of cylindrical members and disposed perpendicularly to each other on two end portions of one rod-like vibration member, the rotation axes of the rotary members serving as the contact members can be fixed, and a two-degree-of-freedom actuator can be constructed as a whole (one vibration member and two rotary members).

The rotating shafts of the rotary members serving as contact members are mechanically fixed to allow feedback control using conventional rotation type displacement sensors, thereby simplifying control.

What is claimed is:

1. A vibration type actuator comprising:

vibration member that generates therein vibration displacements in at least three different directions; and a plurality of contact members contacting said vibration member, wherein the vibration displacements in the three different directions generate a composite vibration that simultaneously moves each of said plurality of contact members relative to said vibration member.

2. A vibration type actuator comprising:

a vibration member that generates therein vibration displacements in at least three different directions; and a plurality of contact members contacting said vibration member, each of said plurality of contact members having a moving axis defined in an axial direction thereof, wherein the vibration displacements in the three different directions generate a composite vibration on said vibration member that acts as a driving force to simultaneously move each of said plurality of contact members relative to said vibration member.

3. An actuator according to claim 1, wherein said vibration member has a rod-like shape having an axis, and each one of said plurality of contact members has a moving axis arranged in a different direction than each other one of said plurality of contact members and crossing the axis of said vibration member.

4. An actuator according to claim 2, wherein said vibration member has a rod-like shape having an axis, and each one of said plurality of contact members has a moving axis arranged in a different direction than each other one of said plurality of contact members, and crossing the axis of said vibration member.

5. An actuator according to claim 1, wherein said vibration member has a rod-like shape having an axis, at least one of said plurality of contact members has a moving axis coinciding with the axis of said vibration member, and remaining ones of said plurality of contact members have moving axes crossing the axis of said vibration member.

6. An actuator according to claim 2, wherein said vibration member has a rod-like shape having an axis, at least one of said plurality of contact members has a moving axis coinciding with the axis of said vibration member, and remaining ones of said plurality of contact members have moving axes crossing the axis of said vibration member.

7. An actuator according to claim 1, wherein said vibration member has a plurality of bearing portions each contacting a respective one of said plurality of contact members and defining a moving axis of said respective one of said plurality of contact members.

8. An actuator according to claim 2, wherein said vibration member has a plurality of bearing portions each contacting a respective one of said plurality of contact members and defining the moving axis of said respective one of said plurality of contact members.

9. An actuator according to claim 1, wherein said vibration member generates vibration displacements in three axial directions substantially perpendicular to one another, and the composite vibration is generated by generating the vibration displacements in three axial directions with a time phase difference there between.

10. An actuator according to claim 2, wherein said vibration member generates vibration displacements in three axial directions substantially perpendicular to one another, and the composite vibration is generated by generating the vibration displacements in three axial directions with a time phase difference there between.

11. An actuator according to claim 1, wherein said vibration member comprises electro-mechanical energy conversion elements for generating lateral vibrations in directions different from that of a longitudinal vibration.

12. An actuator according to claim 2, wherein said vibration member comprises electro-mechanical energy conversion elements for generating lateral vibrations in directions different from that of a longitudinal vibration.

13. An actuator according to claim 1, wherein said plurality of contact members are cylindrical members having different axial directions.

14. An actuator according to claim 2, wherein said plurality of contact members are cylindrical members having different axial directions.

15. An actuator according to claim 1, wherein said vibration member and said plurality of contact members are brought into press contact with each other through bearings.

16. An actuator according to claim 2, wherein said vibration member and said plurality of contact members are brought into press contact with each other through bearings.

17. A vibration type driving apparatus comprising said vibration type actuator of claim 1 as a driving source to drive one or a plurality of driven members using said driving source.

18. A vibration type driving apparatus comprising said vibration type actuator of claim 2 as a driving source to drive one or a plurality of driven members using said driving source.

19. A vibration type driving apparatus comprising said vibration type actuator of claim 9 as a driving source to drive one or a plurality of driven members using said driving source.

20. A vibration type driving apparatus comprising said vibration type actuator of claim 10 as a driving source to drive one or a plurality of driven members using said driving source.

21. A vibration type driving apparatus comprising said vibration type actuator of claim 11 as a driving source to drive one or a plurality of driven members using said driving source.

22. A vibration type driving apparatus comprising said vibration type actuator of claim 12 as a driving source to drive one or a plurality of driven members using said driving source.

23. A vibration type actuator comprising:

a vibration member that generates three vibrations having vibration displacements in directions substantially perpendicular to each others; and a plurality of contact members contacting said vibration member, each of said plurality of contact members having a direction of movement different from each other one of said plurality of contact members;

wherein said vibration member simultaneously generates vibrations in two directions among the three directions to move one of said plurality of contact members, and simultaneously generates vibrations in another two directions among the three directions to move another one of said plurality of contact members.

24. A vibration type actuator according to claim 23, wherein said vibration member simultaneously generates said three vibrations to move all of said plurality of contact members.

25. A vibration type actuator comprising:

a vibration member that generates three vibrations having vibration displacements in directions substantially perpendicular to each other; and a plurality of contact members contacting said vibration member, each one of said plurality of contact members having a direction of movement different from each other one of said plurality of contact members;

wherein said vibration member simultaneously generates at least two of said three vibrations to move a predetermined one of said plurality of contact members in accordance with a combined vibration of said at least two vibrations.

26. A vibration type driving apparatus comprising said vibration type actuator of claim 23 as a driving source to drive one or a plurality of driven members using said driving source.

27. A vibration type driving apparatus comprising said vibration type actuator of claim 24 as a driving source to drive one or a plurality of driven members using said driving source.

* * * * *

UNITED STATES PATENT AND TRADEMARK OFFICE
CERTIFICATE OF CORRECTION

PATENT NO. : 6,380,660 B1  Page 1 of 1
DATED : April 30, 2002
INVENTOR(S) : Takashi Maeno et al.

It is certified that error appears in the above-identified patent and that said Letters Patent is hereby corrected as shown below:

Column 1,
Line 67, "becomes" should read -- become --.

Column 2,
Line 3, "comprise" should read -- comprises --.

Column 6,
Line 50, "press-" should read -- press --.
Line 51, "ingly" should be deleted.

Column 10,
Line 14, "vibration member" should read -- a vibration member --.

Column 11,
Line 5, "there between." should read -- therebetween. --.
Line 11, "there between." should read -- therebetween --.

Column 12,
Line 12, "others;" should read -- other; --.
Line 13, "members;" should read -- members, --.
Line 33, "members;" should read -- members, --.

Signed and Sealed this

Eighth Day of October, 2002

Attest:

*Attesting Officer*

JAMES E. ROGAN
*Director of the United States Patent and Trademark Office*